INVENTOR
OWEN T. ANDERSON
BY
ATTORNEY

Aug. 21, 1962 O. T. ANDERSON 3,050,721

SUPERCONDUCTIVE CIRCUITS

Filed Feb. 24, 1960 4 Sheets-Sheet 4

United States Patent Office 3,050,721

Patented Aug. 21, 1962

3,050,721
SUPERCONDUCTIVE CIRCUITS

Owen T. Anderson, Poughkeepsie, N.Y., assignor to International Business Machines Corporation, New York, N.Y., a corporation of New York Filed Feb. 24, 1960, Ser. No. 10,655
12 Claims. (Cl. 340—347)

This invention relates to superconductive switching networks, and more particularly to superconductive switching networks employed as analog to digital converters.

In the present state of the art, there are many large scale computers effective to process a great amount of information in a rapid and efficient manner. In general, most multi-purpose computers operate upon information in digital form, that is, information represented by the presence or absence of one or more data pulses. However, a great deal of useful information is obtained in analog form, and to process this analog information in multi-purpose digital computers, it is necessary to convert the analog information into digital form.

To accomplish this object, a number of analog to digital converters have been designed employing both mechanical and electronic components. A more recent class of computers has been developed in which the various logical circuits employ the phenomenon of superconductivity, that is, the ability of certain materials to exhibit zero resistance to the flow of an electrical current when cooled to a sufficiently low temperature. In general, superconductive logical circuits are operated at a fixed temperature at which the switchable elements, or gate conductors therein, normally exhibit superconductivity. Application of a magnetic field of predetermined magnitude to these gate conductors, however, is effective to destroy superconductivity, and a resistance to the flow of electrical current is then exhibited.

The required magnetic field is normally generated by means of current flow through control conductors arranged in magnetic field applying relationship with the gate conductors. In order to reduce the power loss by current flow through the control conductors, it is preferred to fabricate these conductors from a "hard" superconductive material, that is one that remains superconducting in the presence of the value of magnetic field that destroys superconductivity in the gate conductors, so that the control conductors exhibit zero electrical resistance at all times. A more detailed discussion of superconductive circuits is contained in an article by D. A. Buck, entitled "The Cryotron—a Superconductive Computer Component," published in the Proceedings of the IRE, vol. 44, No. 4, April 1956, pages 482–493.

What has been discovered is a novel superconductive switching circuit useful as an analog to digital converter. Briefly, according to the invention an electrical current is directed to one of a plurality of output lines under control of the instantaneous value of an analog function. The analog function is effective to maintain all but one of the possible current paths resistive, the one path being completely superconducting. This feature is accomplished by connecting a first plurality of gate conductors in series between the current source and the lowest order output line, each of these gate conductors being maintained normally superconducting. Further, a second plurality of gate conductors is employed in series between the first plurality of gate conductors and the higher order output lines, with each gate conductor being electrically connected between the junction of a pair of the first plurality of gate conductors and a particular output line. Each of the second plurality of gate conductors is normally maintained resistive. Next, an indication is manifested on an output line under control of a second current flow which is proportional to the analog function. An increase in the magnitude of the second current is effective to switch one or more of a pair of complementary gate conductors between conduction states, thus, one of the first plurality of gate conductors is switched from the superconducting to the resistive state, to block a superconducting path to lower order output lines, and one of the second plurality of gate conductors is switched from the resistive to the superconducting state to provide a superconducting path to a selected output line. Conversely, a decrease in the magnitude of the second current is also effective to switch one or more pairs of complementary gate conductors between conduction states, with one of the first plurality of gate conductors being switched from the resistive to superconducting state and one of the second plurality of gate conductors being switched from the superconducting to resistive state. In this manner a unique line exhibits an output manifestation as determined solely by the analog function and further this manifestation responds to both increasing values and decreasing values of the analog function.

It is an object of this invention to provide an improved superconductive switching circuit.

Another object of the invention is to provide an improved superconductive analog to digital converter.

A further object of the invention is to provide a superconductive analog to digital converter responsive to both increasing and decreasing values of an analog function.

Still another object of the invention is to provide a superconductive analog to digital converter wherein the digital output is represented in binary code.

Yet another object of the invention is to provide an improved superconductive analog to digital converter employing a single source of biasing current.

The foregoing and other objects, features and advantages of the invention will be apparent from the following more particular description of preferred embodiments of the invention, as illustrated in the accompanying drawings.

Figure 1:
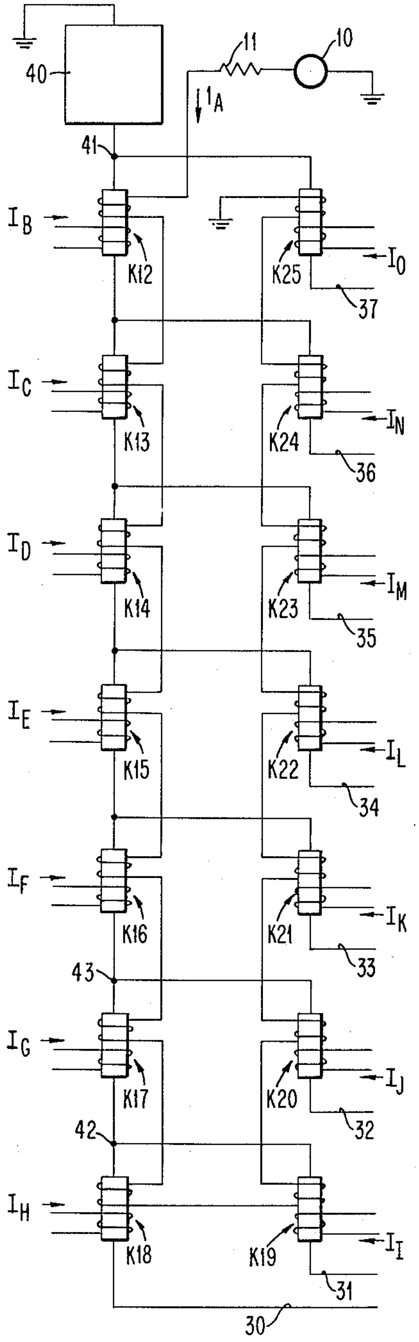
FIG. 1 is a schematic diagram of a first preferred embodiment of the analog to digital converter of the invention.

Referring now to the drawings, FIG. 1 is a schematic diagram illustrating a first embodiment of the superconductive analog to digital converter of the invention. As there shown, the converter develops an output manifestation on one of eight independent output lines, but as will be understood as the description proceeds, a greater or lesser number of independent output lines may be employed as required. An analog sensing element 10, generates a current, $I_A$, which is a function of the condition being sensed. This current flows through a current limiting resistor 11 and then to ground through the serially connected first control conductors of each of cryotrons K12 through K25. Cryotrons K12 through K25 are each provided with a second control conductor to which are supplied independent bias currents $I_B$ through $I_O$. In this manner, the state of the gate conductors of cryotrons K12 through K25, either superconducting or resistive, is determined by the vector sum of the magnetic fields generated by $I_A$ flowing in a first control conductor and the bias current flowing in a second control conductor in each cryotron.

As shown by the current directions illustrated in FIG. 1, these two magnetic fields are mutually aiding in cryotrons K12 through K18 and are mutually opposed in cryotrons K19 through K25. Further, bias currents $I_B$ through $I_H$ have a magnitude such that each of these bias currents generates a magnetic field which by itself is not sufficient to switch the gate conductor of the associated cryotron from the superconducting to the resistive state, and for this reason, the gate conductors of cryotrons K12 through K18 are normally superconducting in the absence of current $I_A$ at the low temperature at which the converter is operated. Conversely, bias currents $I_I$ through $I_O$ have a magnitude such that each of these bias currents generates a magnetic field which by itself is sufficient to switch the gate conductor of the associated cryotron from the superconducting to the normal resistance state and for this reason, the gate conductors of cryotrons K19 through K25 are normally resistive in the absence of current $I_A$, at the operating temperature.

Figure 2:
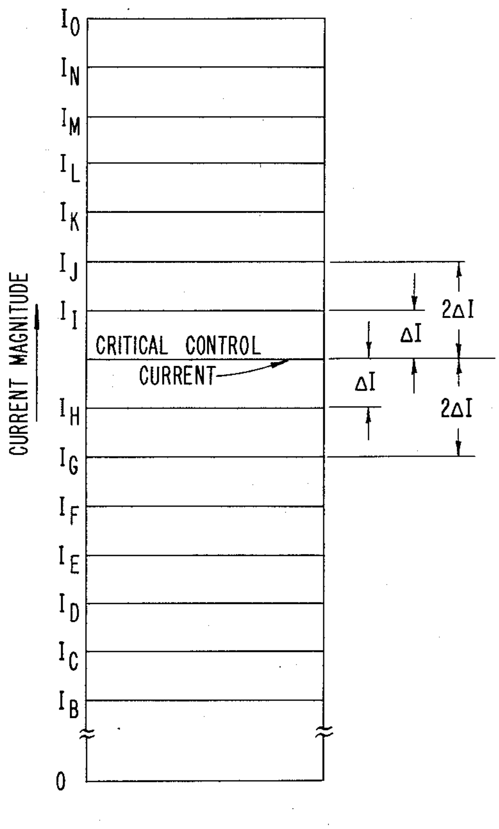
FIG. 2 is a graph illustrating the magnitude of the various biasing currents employed in the embodiment of FIG. 1.

Additionally, as shown in FIG. 2, each bias current has a unique value, the magnitude of which progressively increases from $I_B$ through $I_H$, each of which is below the critical control current of each cryotron and continues to increase from $I_I$ through $I_O$, each of which is above the critical control current of each cryotron. As used in this specification, the critical control current is that value of current flowing in a single control conductor of a cryotron, which is effective to generate the critical magnetic field necessary to switch the gate conductor of the cryotron from the superconducting to the resistive state. As shown in FIG. 2, each cryotron has the same value of critical control current, and it is this type of cryotron which is employed in the preferred embodiments of the invention herein described. It should be understood, however, that cryotrons having various values of critical control current can be employed, and in this case FIG. 2 represents the normalized values of the bias currents for each cryotron.

Referring now to the FIGS. 1 and 2, the means by which one of the eight output lines, labelled 30 through 37 in FIG. 1, exhibit an output manifestation as a function of the magnitude of the current developed by analog sensing element 10 is next described. As shown in FIG. 1, a current source 40 delivers a current to a junction 41 and in the absence of a current $I_A$ from sensing device 10, this current flows through the serially connected gate conductors of cryotrons K12 through K18 to output line 30 which may represent, by way of example, a digital 0. All of the current from source 40 flows to line 30 at this time since with $I_A=0$, the series connected gate conductors of cryotrons K12 through K18 are superconducting and the possible parallel paths to each of lines 31 through 37 are blocked by the resistive gate conductors of cryotrons K19 through K25, respectively. As the current $I_A$ from sensing device 10 increases, a value equal to or slightly greater than $\Delta I$ is obtained. As shown in FIG. 2, this value, together with the value of bias current $I_H$ equals the critical control current value of cryotron K18, since as stated above, the magnetic fields generated by $I_A$ and $I_H$ are mutually aiding in cryotron K18. At this time, the gate conductor of cryotron K18 switches from the superconducting to the resistive state, to thereby block the superconducting path from current source 40 to line 30. However, simultaneously with the switching of the gate conductor of cryotron K18, current $I_A$ flowing in the first control conductor of cryotron K19 is effective to generate a magnetic field which subtracts from the magnetic field generated by bias current $I_I$ flowing in the second control conductor of cryotron K19 causing the gate conductor of cryotron K19 to switch from the resistive to the superconducting state. Thus, when current $I_A$ attains a value of $\Delta I$, the current from source 40 flows through a single superconducting path consisting of the gate conductors of cryotrons K12 through K17 to a junction 42, and thence through the now superconducting gate conductor of cryotron K19 to line 31, which may represent, by way of example, a digital 1. Again the possible superconducting paths existing from current source 40 to lines 30 and 32 through 37 are blocked by the resistive gate conductors of cryotrons K18 and K20 through K25, respectively.

As current $I_A$ continues to increase a new value of current $2\Delta I$, or slightly greater, is obtained which is effective to switch a second pair of complementary cryotrons. As shown in FIG. 2, with $I_A=2\Delta I$, the vector sum of $I_A$ and bias current $I_G$ equals the critical control current of cryotrons K17 causing the gate conductor thereof to switch from the superconducting to the resistive state. Simultaneously, the vector sum of $I_A$ and bias current $I_J$ equals the critical control current of cryotron K20 causing the gate conductor thereof to switch from the resistive to the superconducting state. Thus, at the time $I_A=2\Delta I$, a superconducting path exists only from current source 40 through the gate conductors of cryotrons K12 through K16 to a junction 43 through the now superconducting gate conductor of cryotron K20 to line 32 which may represent, by way of example, a digital 2. The possible superconducting paths to lines 30, 31 and 33 through 37 are blocked by the resistive gate conductors of cryotron K17 (which isolates lines 30 and 31 although the gate conductor of cryotron K18 is also resistive), and cryotrons K21 through K25.

It should now be understood that further increases in the magnitude of current $I_A$ is effective to switch one or more of a first of a pair of complementary cryotrons from the superconducting to the resistive state and to switch a second of the pair of complementary cryotrons from the resistive to the superconducting state to thereby define a single superconducting path from current source 40 to a unique output line 33 through 37.

In a similar manner to that described immediately above, decreasing values of $I_A$ are also effective to apply a manifestation to a unique output line depending only on the value of $I_A$. Continuing with the detailed example above with the value of $I_A=2\Delta I$, and the current from source 40 directed to output line 32, when $I_A$ drops to a value less than $2\Delta I$ but greater than $\Delta I$, a reverse switching action occurs. Thus, with $I_A<2\Delta I>\Delta I$, the vector sum of $I_A$ and $I_G$ is less than the critical control current of cryotron K17, and the gate conductor thereof switches from the resistive to the superconducting state. Simultaneously, the vector sum of $I_A$ and $I_J$ is greater than the critical control current of cryotron K20 and the gate conductor thereof switches from the superconductive to the normal resistive state. At this time, current from source 40 flowing to junction 43 is shifted from the now resistive path including the gate conductor of cryotron K20 to the superconducting path including the gate conductor of cryotron K17, junction 42, the gate conductor of cryotron K19 and line 31. Again, when $I_A$ decreases to a value below $\Delta I$, another complementary pair of cryotrons switch states, with the gate conductor of cryotron K18 becoming superconducting and the gate conductor of cryotron K19 becoming resistive. As a result of this switching action, the current shifts from the path including the now resistive gate conductor of cryotron K19 and line 31 to the now superconducting path including the gate conductor of cryotron K18 and line 30.

It thus has been shown that as the current $I_A$ delivered by sensing unit 10 increases and decreases, one and only one output line is energized to control further superconductive circuits, by the switching of a pair of complementary cryotrons each time current $I_A$ changes by a predetermined amount.

Figure 3:
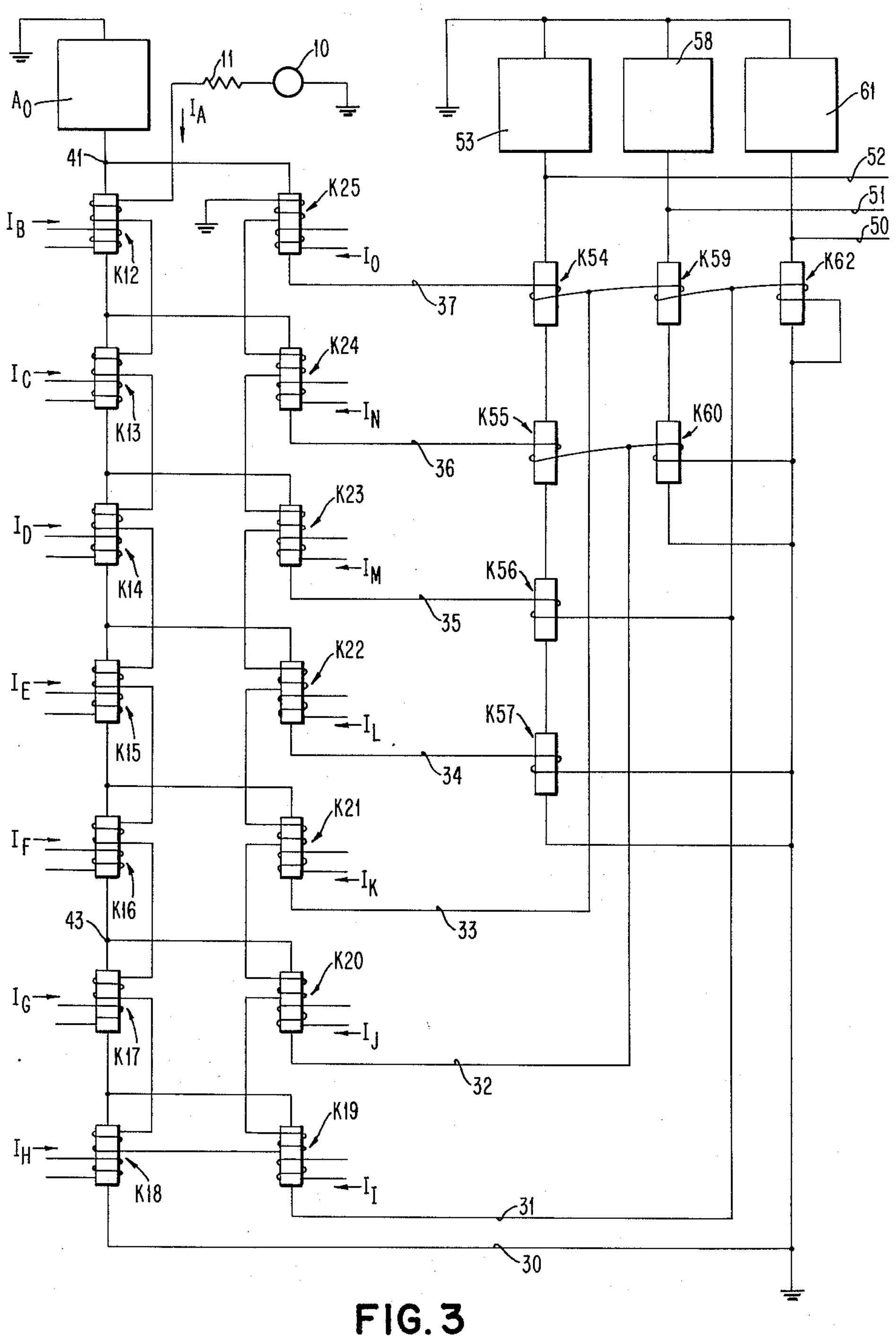
FIG. 3 is a schematic diagram of another preferred embodiment of the analog to digital converter of the invention.

Referring now to FIG. 3, there is illustrated a schematic diagram of a second preferred embodiment of the analog to digital converter of the invention. As there shown, the converter of FIG. 1 additionally includes a superconductive network which presents the digital output in three digit binary code. Further, the three digit binary output is developed as a voltage appearing on output lines 50, 51 and 52, where line 50 represents the least significant digit, line 51 represents the next least significant digit, and line 52 represents the most significant digit, it being understood that a greater or lesser number of output lines may be employed as required. This output includes the advantage that the binary digits may be delivered to equipment operating at other than a superconductive temperature.

As shown in FIG. 3, a first current source 53 delivers a current to the serially connected gate conductors of cryotrons K54 through K57, a second current source 58 delivers a current to the serially connected gate conductors of cryotrons K59 and K60, and a third current source 61 delivers a current to the gate conductor of cryotron K62. When any one of the cryotron gates K54 through K57 is resistive the current from source 53 applied to the resistive gate produces a voltage signal which appears on an output line 52. Similarly, voltage signals are produced on an output line 51 when either of the cryotrons K59 or K60 is resistive and on an output line 50 when cryotron K62 is resistive. The presence of a voltage on these output lines indicates a binary 1 and the absence of a voltage indicates a binary 0.

By way of example, if line 30 is energized, in the manner discussed above, current from source 40 flows directly to ground and no voltage appears on lines 50, 51 or 52. This represents, in binary code, 000. However, current from source 40 directed to line 31 additionally flows through the control conductor of cryotron K62 to switch the gate conductor thereof from the superconducting to the resistive state. Current from source 61 flowing through the now resistive gate conductor of cryotron K62 develops a voltage which appears at line 50. At this time lines 52, 51 and 50 represent the binary digits 001. In like manner, current from source 40 flowing along line 32, flows through the control conductor of cryotron K60, only, to develop the output binary digits 010. Continuing, it can be seen that with line 33 energized an output representative of the binary digits 011 is developed, with line 34 energized the binary digits 100 are developed, with line 35 energized the binary digits 101 are developed, with line 36 energized the binary digits 110 are developed, and with line 37 energized the binary digits 111 are developed.

Figure 4:
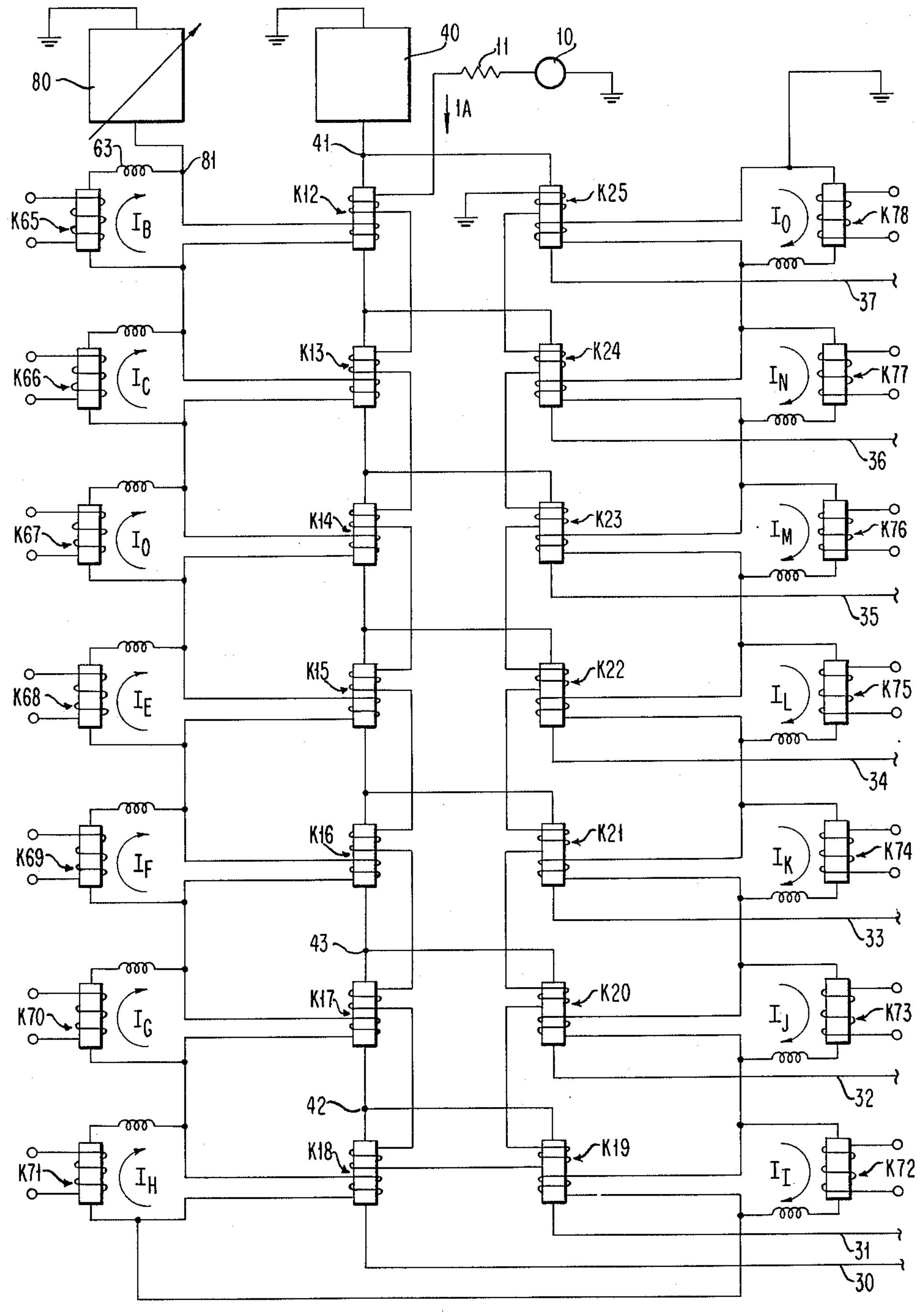
FIG. 4 is a schematic diagram of a further preferred embodiment of the analog to digital converter of the invention.

Referring now to FIG. 4, there is illustrated a third preferred embodiment of the analog to digital converter of the invention, wherein the necessary bias currents for the complementary cryotrons are obtained by means of stored persistent currents. With reference to cryotron K12, it is seen that the second control conductor thereof is electrically connected in parallel with the gate conductor of a cryotron K65 to form a closed superconducting loop. From superconductive theory and experiments it has been established that once a current is induced to flow around such a loop it continues to flow undiminished until such time as either the loop is broken or resistance is induced in the loop. In a manner similar to cryotron K12, the second control conductors of cryotrons K13 to K25 are connected in parallel with the gate conductors of cryotrons K66 through K78, respectively, to form additional superconducting loops. Further, each of these superconducting loops are electrically connected in series one to another and with an adjustable current source 80. Selective energization of the control conductors of cryotrons K65 through K78 is effective to establish the individual bias currents $I_B$ through $I_O$. The manner in which these currents are independently adjusted is completely described in copending application Serial No. 861,392, filed December 22, 1959, on behalf of Donald R. Young and assigned to the assignee of this application, and therefore will be but briefly reviewed in this application. Current from source 80 flows to a junction 81 and thence divides between a pair of parallel superconducting paths, the first including the gate conductor of cryotron K65 and the second including the second control conductor of cryotron K12, the division ratio being inversely proportional to the ratio of the inductance in each path. For purposes of illustration only, it is assumed that the inductances in each path are equal as indicated by inductor 63 in series with the gate conductor of cryotron K65, but it should be understood that this limitation is not necessary and any inductance ratio may be employed. Next, the current from source 80 is adjusted to a value equal to $2I_B$ and the control conductor of cryotron K65 is energized. Energization of this control conductor is effective to switch the gate conductor of cryotron K65 from the superconducting to the resistive state and at this time the entire current from source 80 flows in the second path. Next, the control conductor of cryotron K65 is deenergized allowing the gate conductor thereof to again become superconducting. However, the total current, $2I_B$, from source 80 remains flowing in the second path. At this time, if the current from source 80 were interrupted a persistent circulating current would be established in the superconducting loop consisting of the gate conductor of cryotron K65 and the second control conductor of cryotron K12 determined both by the magnitude of the current flowing in the second control conductor of cryotron K12 and the inductance in the first and second paths. In the present example, with a current equal to $2I_B$ and equal inductances in each path, a circulating current equal to $I_B$ is established.

However, it is not necessary at this time to interrupt the current from source 80, rather the remaining bias currents are first established. This results from the fact that once the current is established in the parallel branches of the loop in a ratio which is not inversely proportional to the inductances in the branches, a net flux threads the loop which thereafter can not be changed during the time interval the loop is totally superconducting. Thus, an increase or decrease in the magnitude of the current delivered by source 80 is ineffective to change the net flux stored in the loop. Next, the current from source 80 is increased until a value equal to $2I_C$ is attained and the control conductor of cryotron K66 is energized to cause this current to flow entirely through the second control conductor of cryotron K13 and then the control conductor of cryotron K66 is deenergized. Continuing in like manner, the current from source 80 is progressively increased in steps to condition each of the loops by first energizing and then deenergizing the control conductors of cryotrons K67 through K78. At this time, the current from source 80 is decreased to zero, and each superconducting loop conducts a persistent circulating current equal in magnitude to the desired bias current. Current from source 40 is then directed to one of the output lines 30 through 37, under control of the magnitude of current $I_A$ in the manner described above with reference to FIG. 1. Further current $I_A$ does not disturb the individual bias currents due to the fact that the bias currents are much greater than $I_A$ and also the inductance on the superconducting loops is relatively large.

Figure 5:
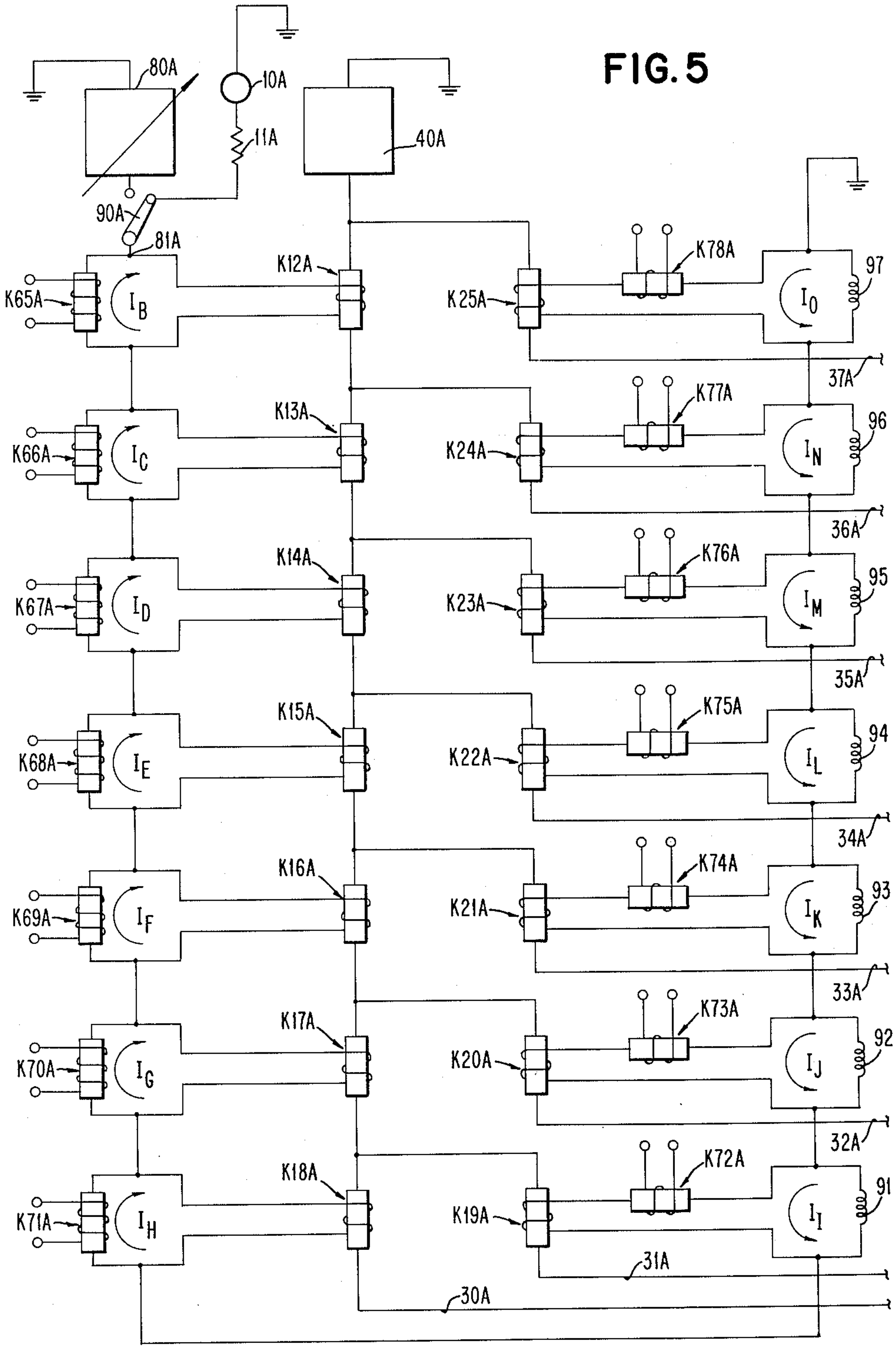
FIG. 5 is a schematic diagram of yet another preferred embodiment of the analog to digital converter of the invention.

Referring now to FIG. 5, there is illustrated a fourth preferred embodiment of the analog to digital converter of the invention wherein the persistent bias currents, and a current proportional to an analog function flowing in the superconducting loops, together determine the state of the complementary cryotrons. Initially, the bias currents are adjusted in a manner similar to that described above with reference to FIG. 4. A switch 90A is transferred from the position shown in FIG. 5, to connect the biasing loops in series with a current source 80A. Next, each of the control conductors of cryotrons K65A through K78A are first energized and then deenergized as source 80A is progressively adjusted to yield predetermined values of persistent currents. The energization of each of cryotrons K65A through K71A is effective to shift the current from source 80A through the control conductors of cryotrons K12A through K18A, respectively, to establish persistent currents $I_B$ through $I_H$ which circulate in a first direction as shown in FIG. 5. However, the energization of cryotrons K72A through K78A is effective to shift the current from source 80A through inductors 91 through 97, respectively, to establish persistent currents $I_I$ through $I_O$ which circulate in a second direction as shown in FIG. 5. Next, switch 90 is transferred to the position shown in FIG. 5, and the current $I_A$ generated by sensing element 10A is effective to reinforce the bias currents $I_B$ through $I_H$ flowing in the control conductors of cryotrons K12A through K18A and to oppose the bias currents flowing in the control conductors of cryotrons K19A through K25A to obtain the complementary switching action. By way of example, with $I_A=0$, the current from source 40A flows through the superconducting gate conductors of cryotrons K12A through K18A to output line 30 as previously described. As $I_A$ increases above zero, this current divides with a first portion flowing in a first of the parallel paths of each superconducting loop and a second portion flowing in a second of the parallel paths. More particularly, a first portion of $I_A$ flows through the gate conductor of cryotron K71A in a direction opposite to the circulating bias current $I_H$, and a second portion flows through the control conductor of cryotron K18A in the same direction as bias current $I_H$ to thereby apply a more intense magnetic field to the gate conductor of cryotron K18A. When $I_A$ attains a predetermined value, the gate conductor of K18A switches from the superconducting to the resistive state. Simultaneously with the switching of K18A, cryotron K19A switches from the resistive to the superconducting state. This complementary switching action occurs since the portion of $I_A$ flowing through the control conductor of cryotron K19A generates a magnetic field which opposes the magnetic field generated by bias current $I_I$ flowing therethrough.

It should now be understood that increasing and decreasing values of $I_A$ are effective to switch a complementary pair of cryotrons between states to direct the current from source 40A to a unique one of output lines 30A through 37A.

Although each of the schematic diagrams of the drawings illustrates the control conductors as coils, this has been done as an aid in understanding the various features of the invention, and it will be understood that thin film cryotrons of the type disclosed in copending application Serial No. 625,512, filed November 30, 1956 on behalf of Richard L. Garwin and assigned to the assignee of this invention may also be employed. Further, as the methods and apparatus required to attain and maintain the required superconductive temperature are well known to those skilled in the art, they have neither been shown nor described herein.

While the invention has been particularly shown and described with reference to preferred embodiments thereof, it will be understood by those skilled in the art that various changes in form and details may be made therein without departing from the spirit and scope of the invention.

What is claimed is:

1. A superconductive analog to digital converter comprising; a plurality of superconductive complementary gate conductor pairs; means maintaining said pairs of gate conductors at a temperature at which each is normally superconducting; a plurality of output lines representing digital data; a current source; means connecting a first of each pair of gate conductors electrically in series between said source and the output line representing the lowest order digital datum; circuit means forming an alternate path in parallel with each of said first gate conductors; each of said alternate paths including a second of said pair of gate conductors and one of said output lines; first means modifying the critical magnetic field of each of said gate conductors, said last named means being ineffective of and by itself to switch each of said first gate conductors to the resistive state and effective of and by itself to switch each of said second gate conductors to the resistive state; and further means modifying the critical magnetic field of said gate conductors, said further means being proportional to an analog function and effective in conjunction with said first modifying means to switch a pair of complementary gate conductors between the superconducting and resistive state in response to a predetermined change in said analog function, whereby current from said source is directed to a unique output line through a superconducting path determined by said further means.

2. A superconductive circuit comprising; a plurality of output lines representing digital data; means to generate a first current proportional to an analog function; and means to energize a unique one of said plurality of output lines in response to the magnitude of said first current, said last named means including a plurality of pairs of complementary superconductive gate conductors, means maintaining said gate conductor pairs at a temperature at which each is normally superconducting, a current source, means connecting a first of each of said gate conductors in series with said current source, means connecting a second of each of said gate conductors in shunt with a corresponding complementary one of said first gate conductors and in series with one of said output lines, means to magnetically bias said second of each of said gate conductors in the resistive state, means responsive to changes in the magnitude of said first current to switch one of said first of a pair of gate conductors from the superconducting to the resistive state and to simultaneously switch the complementary one of said pair of gate conductors from the resistive to the superconducting state whereby a unique one of said output lines is connected to said current source through a completely superconducting path.

3. A superconductive switching network comprising; first, second, third, fourth, fifth and sixth superconductive gate conductors; means maintaining said gate conductors at a superconductive temperature; a current source; means connecting said first, second and third gate conductors in series with said source; first, second and third output lines; means connecting said fourth gate conductor in series between said first output line and the junction of said first gate conductor and said source; means connecting said fifth gate conductor in series between said second output line and the junction of said first and second gate conductors; means connecting said sixth gate conductor in series between said third output line and the junction of said second and third gate conductors; first and second groups of control means associated with each of said first, second, third, and said fourth, fifth, sixth gate conductors, respectively, and effective to control the resistance thereof; and input signal means coupled to said first and second groups of control means for applying signals thereto, said signals being thereby effective to direct current from said source to one of said output lines along a superconducting path determined by the magnitude of said signals.

4. The network of claim 3 including bias current means for each of said control means; means coupling said bias currents to each of said control means; said bias currents coupled to said first group of control means associated with said first, second and third gate conductors being ineffective to switch the corresponding gate conductor from the superconducting to the resistive state, and said bias currents coupled to said second group of control means associated with said fourth, fifth and sixth gate conductors being effective to switch the corresponding gate conductor from the superconducting to the resistive state.

5. The network of claim 3 including bias current means for each of said control means; means coupling said bias currents to each of said control means; said bias currents coupled to said first group of control means associated with said first, second and third gate conductors being effective to switch the corresponding gate conductor from the superconducting to the resistive state and said bias currents coupled to said group of control means associated with said fourth, fifth and sixth gate conductors being ineffective to switch the corresponding gate conductor from the superconducting to the resistive state.

6. An analog to digital converter comprising; first, second, third, fourth, fifth and sixth cryotrons; each of said cryotrons including a gate conductor of superconductive material and a control conductor; means maintaining each of said cryotrons at a superconductive temperature; first, second and third output lines; a current source; means connecting the gate conductors of said first, second and third cryotrons in series with said source; circuit means forming an alternate path in parallel with each of said serially connected gate conductors; each of said alternate paths including one of said gate conductors of said fourth, fifth and sixth cryotrons and one of said output lines; and means for directing current from said source to one of said output lines in accordance with the magnitude of an analog function, said last named means including means coupling signals representative of said function to all of said control conductors whereby the gate conductor in each of said alternate paths is in the conduction state opposite the conduction state of said paralleled serially connected gate conductor.

7. A superconductive switching network comprising, a plurality of superconductive gate conductor pairs; a plurality of output lines representing digital data; a first current source; means connecting a first of each pair of gate conductors electrically in series between said source and the output line representing the lowest order digital datum; circuit means forming an alternate path in parallel with each of said first gate conductors; each of said alternate paths including a second of said pair of gate conductors and one of said output lines; a plurality of loops of superconductive material; means maintaining each of said pair of gate conductors and said loops at a superconductive temperature; each of said loops including first and second superconducting parallel current paths, each of said first paths including a control conductor associated with one of said gate conductors for applying magnetic fields thereto; a second current source for supplying currents of different magnitudes; means connecting said loops in series with said second current source; means cooperating with said second current source for establishing persistent circulating currents in each of said loops, said currents in said loops associated with said first gate conductors circulating in a first direction and said currents in said loops associated with said second gate conductors circulating in a second direction, and means conducting current proportional to a predetermined function in series with said loops, said last named current effective to increase the magnitude of current flowing in the control conductors associated with said first gate conductors and to decrease the magnitude of current flowing in the control conductors associated with said second gate conductors.

8. The network of claim 7 wherein said means cooperating with said second current source includes a plurality of superconductive gate conductors; means connecting one of said gate conductors in series with the second path of each of said superconducting loops associated with said first gate conductors and connecting one of said gate conductors in series with the first path of each of said superconducting loops associated with said second gate conductors; a plurality of control conductors, each of said control conductors associated with one of said gate conductors for applying magnetic fields thereto; and means selectively operable to energize said control conductors to render said associated gate conductor resistive.

9. A superconductive analog to digital converter comprising; a plurality of pairs of complementary cryotrons; means maintaining said cryotrons at a temperature at which the gate conductors thereof are normally superconducting; each of said gate conductors having first and second terminals; a plurality of output lines representing digital data; a current source; first superconducting circuit means connecting said first terminal of the gate conductor of one of the first of a pair of cryotrons electrically in series with said current source, connecting the first terminal of the gate conductors of the remaining first of each of said pairs of cryotrons electrically in series with the second terminal of the gate conductors of the first of each of said pairs of cryotrons, and connecting the second terminal of the last of said serially connected cryotrons electrically in series with the output line representing the lowest order of digital datum, whereby a normally superconducting path is provided between said current source and said lowest order output line; second superconducting circuit means connecting the first terminal of the gate conductors of each of the second of said pairs of cryotrons electrically in parallel with the first terminal of the gate conductor of the first of each complementary cryotron and connecting the second terminal of the gate conductor of each of said second of said pairs of cryotrons electrically in series with a predetermined output line; means tending to maintain the gate conductors of each of said second of said pairs of cryotrons resistive to thereby isolate each of said predetermined output lines from said current source, said last named means including a first control conductor for each of said second of said pairs of cryotrons, first means supplying a first plurality of independent biasing currents to each of said first control conductors, said first biasing currents being proportional to the digital datum represented by the output line to which the corresponding gate conductor is connected, and each of said first biasing currents being effective to switch said corresponding gate conductor from the superconducting to the resistive state; means modifying the critical magnetic field of the gate conductors of each of said first of said pairs of cryotrons, including a first control conductor for each of said first of said pairs of cryotrons, means supplying a second plurality of independent biasing currents to each of said first control conductors, each of said second plurality of biasing currents being proportional to the magnitude of each of said first plurality of biasing currents supplied to the complementary second of said pairs of cryotrons, and each of said second biasing currents being ineffective by itself to switch the corresponding gate conductors from the superconducting to the resistive state; a current proportional to an analog function; and further superconducting circuit means conducting said analog current to reinforce the magnetic fields generated by said second biasing currents and to oppose the magnetic fields generated by said first biasing currents, whereby each of the gate conductors of one of said pairs of cryotrons oppositely switch between the superconducting and resistive states in response to a predetermined change in the magnitude of said analog current to provide a unique superconducting path between said current source and one of said output lines.

10. The converter of claim 9, wherein said further superconducting circuit means includes a second control conductor for each of said cryotrons, and means connecting each of said second control conductors electrically in series with said analog current.

11. The converter of claim 9 including means maintaining each of said first control conductors superconducting; means connecting each of said first control conductors in parallel with a superconducting network to form a superconducting loop; and means to induce persistent circulating currents in each of said loops, said persistent currents being effective to provide said first and second plurality of biasing currents.

12. The converter of claim 11 including means connecting said superconducting loops electrically in series one to another and in series with said further supercoducting circuit means.

References Cited in the file of this patent

UNITED STATES PATENTS

| | | |
|---|---|---|
| 2,570,221 | Earp et al. | Oct. 9, 1951 |
| 2,949,602 | Crowe | Aug. 16, 1960 |